US012232509B2

(12) United States Patent
Gutierrez et al.

(10) Patent No.: US 12,232,509 B2
(45) Date of Patent: Feb. 25, 2025

(54) METHOD FOR MANUFACTURING CHEWING GUM WITH SCORING (71) Applicant: PERFETTI VAN MELLE BENELUX BV, HK Breda (NL)

(72) Inventors: Margarita Tecanhuey Gutierrez, Puebla (MX); Arturo Perez, Puebla (MX); Fernando Alvarez Peredo, Puebla (MX); Marcos Adolfo Perez Castillo, Puebla (MX)

(73) Assignee: PERFETTI VAN MELLE BENELUX BV, HK Breda (NL)

( * ) Notice: Subject to any disclaimer, the term of this patent is extended or adjusted under 35 U.S.C. 154(b) by 821 days.

(21) Appl. No.: 17/275,533

(22) PCT Filed: Oct. 3, 2019

(86) PCT No.: PCT/US2019/054535
§ 371 (c)(1),
(2) Date: Mar. 11, 2021

(87) PCT Pub. No.: WO2020/076613
PCT Pub. Date: Apr. 16, 2020

(65) Prior Publication Data
US 2022/0030904 A1 Feb. 3, 2022

Related U.S. Application Data
(60) Provisional application No. 62/742,853, filed on Oct. 8, 2018.

(51) Int. Cl.
*A23G 3/02* (2006.01)
*A23G 3/34* (2006.01)
(Continued)

(52) U.S. Cl.
CPC ......... *A23G 3/0247* (2013.01); *A23G 3/0027* (2013.01); *A23G 4/04* (2013.01); *A23G 7/0018* (2013.01); *A23G 7/0068* (2013.01)

(58) Field of Classification Search
CPC ...... A23G 7/0068; A23G 4/04; A23G 3/0247; A23G 3/0027; A23G 7/0018
See application file for complete search history.

(56) References Cited

U.S. PATENT DOCUMENTS 2,643,619 A   6/1953   Bonebrake
3,301,454 A   1/1967   Wayne et al.
(Continued)

FOREIGN PATENT DOCUMENTS

GB   2422291 A    7/2006
JP      49889 A    1/1974
JP   59187989 U   12/1984

OTHER PUBLICATIONS

International Search Report of the International Searching Authority; International Application No. PCT/US2019/054535; International Filing date: Oct. 3, 2019; Date of Mailing: Jan. 21, 2020, 5 pages.
(Continued)

*Primary Examiner* — Jenna A Watts
(74) *Attorney, Agent, or Firm* — Silvia Salvadori, P.C.; Silvia Salvadori (57) ABSTRACT A method for separating a comestible structure into a plurality of comestible structures includes providing at least one comestible structure including at least one score line to a clamping device, clamping a portion of said at least one comestible structure in said clamping device, and separating said portion from a remainder of said at least one comestible structure at said at least one score line via said clamping device.

17 Claims, 10 Drawing Sheets (51) Int. Cl.
 *A23G 4/04* (2006.01)
 *A23G 7/00* (2006.01)

(56) References Cited

U.S. PATENT DOCUMENTS

| | | |
|---|---|---|
| 10,334,867 B2 | 7/2019 | Buck et al. |
| 2017/0099854 A1 | 4/2017 | Mecrin et al. |

OTHER PUBLICATIONS

Written Opinion of the International Searching Authority; International Application No. PCT/US2019/054535; International Filing Date: Oct. 3, 2019; Date of Mailing: Jan. 21, 2020; 9 pages.
Chinese Office Action for Chinese Patent Application No. 201980060325.X; Report Mail Date Feb. 16, 2023; Partial Machine Translation (pp. 1-13).
International Preliminary Report on Patentability for International Application No. PCT/US2019/054535; International Filing Date Oct. 3, 2019; Report Mail Date Apr. 22, 2021 (pp. 1-9).
Japanese Office Action for Japanese Patent Application No. 2021-515159; Report Mail Date Mar. 14, 2022; Partial Machine Translation (pp. 1-8).
NPL_URL:https://cookpad.com/recipe/4725756; Cookpad.com "Melts Quickly—Curry Roux" (pp. 1-7).
Chinese Office Action for Chinese Patent Application No. 201980060325.X; Report Mail Date Nov. 18, 2023; with Machine Translation (10 Pages).
Japanese Office Action for Japanese Patent Application No. 2022-180926; Report Mail Date Mar. 14, 2022; With Machine Translation (8 Pages).
Office Action issued Apr. 29, 2024 in connection with counterpart chinese application No. 201980060325.x.

METHOD FOR MANUFACTURING CHEWING GUM WITH SCORING

CROSS REFERENCE TO RELATED APPLICATIONS

This application is a National Stage Application of PCT/US2019/054535, filed Oct. 3, 2019, which claims priority to U.S. Provisional Application No. 62/742,853 filed Oct. 8, 2018, both of which are incorporated by reference in their entirety herein.

FIELD

The present invention relates to comestible manufacturing methods and systems and more particularly, to a method and system for separating a comestible after forming and sizing a comestible.

BACKGROUND

Traditional systems used to manufacture gum can require multiple process steps, including removing scored sheets from the production line for off-line conditioning, separation, and cutting. As a result, gum pieces manufactured by these systems can sometimes include deformations and other inconsistencies due to removal and transportation to off-line areas. In addition, conventional systems typically require manual operator activities that can result in inefficiency of time, space, and cost. These manual operator activities may also be a source of contamination for the gum product being produced.

Accordingly, a manufacturing system capable of streamlining and simplifying a gum separation process while reducing deformation is desirable.

BRIEF SUMMARY

According to an embodiment, a method for separating a comestible structure into a plurality of comestible structures includes providing at least one comestible structure including at least one score line to a clamping device, clamping a portion of said at least one comestible structure in said clamping device, and separating said portion from a remainder of said at least one comestible structure at said at least one score line via said clamping device.

In addition to one or more of the features described above, or as an alternative, in further embodiments separating said portion of the at least one comestible structure from said remainder of the at least one comestible structure further comprises rotating said portion of the at least one comestible structure away from said remainder of the at least one comestible structure.

In addition to one or more of the features described above, or as an alternative, in further embodiments said at least one score line is a line of weakness formed in the at least one comestible structure, the at least one score line having a thickness less than a thickness of the at least one comestible structure.

In addition to one or more of the features described above, or as an alternative, in further embodiments comprising clamping another portion of the at least one comestible structure via said clamping device, wherein said another portion is part of said remainder of said at least one comestible structure.

In addition to one or more of the features described above, or as an alternative, in further embodiments said clamping device includes a first clamping assembly for clamping said portion of said at least one comestible structure and a second clamping assembly for clamping said another portion of said at least one comestible structure.

In addition to one or more of the features described above, or as an alternative, in further embodiments said first clamping assembly includes an upper portion and a lower portion, and said clamping said portion of said at least one comestible structure includes applying a first clamping force to said portion of said at least one comestible structure by moving said upper portion of said first clamping assembly relative to said lower portion of said first clamping assembly.

In addition to one or more of the features described above, or as an alternative, in further embodiments said second clamping assembly includes an upper portion and a lower portion, and said clamping said another portion of said at least one comestible structure includes applying a second clamping force to said another portion of said at least one comestible structure by moving said upper portion of said second clamping assembly relative to said lower portion of said second clamping assembly.

In addition to one or more of the features described above, or as an alternative, in further embodiments separating said portion of said at least one comestible structure from a remainder of said at least one comestible structure at said at least one score line via said clamping device further comprises rotating said first clamping assembly about an axis away from said second clamping assembly.

In addition to one or more of the features described above, or as an alternative, in further embodiments comprising transporting said separated portion of at least one comestible structure to a downstream processing system.

In addition to one or more of the features described above, or as an alternative, in further embodiments said downstream processing system is a packaging system.

In addition to one or more of the features described above, or as an alternative, in further embodiments said transporting said separated portion of at least one comestible structure to said downstream processing system occurs automatically via a transport mechanism in response to said separating said portion of said at least one comestible structure from said remainder of said at least one comestible structure.

In addition to one or more of the features described above, or as an alternative, in further embodiments said transporting said separated portion of said at least one comestible structure to said downstream processing system is performed by a collaborative robot.

In addition to one or more of the features described above, or as an alternative, in further embodiments at least one of said clamping said portion of said at least one comestible structure in said clamping device and said separating said portion from a remainder of said at least one comestible structure at said at least one score line via said clamping device is performed by a collaborative robot.

In addition to one or more of the features described above, or as an alternative, in further embodiments said at least one comestible structure is a sheet.

In addition to one or more of the features described above, or as an alternative, in further embodiments said at least one comestible structure includes a plurality of vertically stacked comestible structures.

In addition to one or more of the features described above, or as an alternative, in further embodiments each of the plurality of vertically stacked comestible structures has at least one score line, and said at least one score line of each comestible structure is generally vertically aligned.

In addition to one or more of the features described above, or as an alternative, in further embodiments separating said portion from said remainder of said at least one comestible structure at said at least one score line further comprises applying a force to said portion, said force being greater than a tensile strength of said at least one comestible structure at said at least one score line.

In addition to one or more of the features described above, or as an alternative, in further embodiments said comestible includes a chewing gum.

In addition to one or more of the features described above, or as an alternative, in further embodiments said comestible includes a confection.

According to another embodiment, a method for separating a comestible structure into a plurality of comestible structures includes providing at least one comestible structure including at least one score line, said score line defining a first portion and a second portion of said at least one comestible structure and rotating said first portion of said at least one comestible structure about an axis of rotation away from said second portion of said at least one comestible structure to separate said first portion of said at least one comestible structure from said second portion of said at least one comestible structure at said at least one score line.

In addition to one or more of the features described above, or as an alternative, in further embodiments said rotating said first portion of said at least one comestible structure about said axis of rotation away from said second portion applies a tension to said comestible structure at said at least one score line.

In addition to one or more of the features described above, or as an alternative, in further embodiments said axis of rotation is offset from said at least one comestible structure.

In addition to one or more of the features described above, or as an alternative, in further embodiments said axis of rotation is offset from said at least one score line.

In addition to one or more of the features described above, or as an alternative, in further embodiments said rotating said first portion of said at least one comestible structure about an axis of rotation away from said second portion of said at least one comestible structure is controlled automatically by an actuation mechanism.

In addition to one or more of the features described above, or as an alternative, in further embodiments further comprising applying a clamping force to said first portion of said at least one comestible structure prior to rotating said first portion of said at least one comestible structure about an axis of rotation away from said second portion of said at least one comestible structure.

In addition to one or more of the features described above, or as an alternative, in further embodiments the at least one comestible structure is a chewing gum sheet.

In addition to one or more of the features described above, or as an alternative, in further embodiments the at least one comestible structure includes a plurality of vertically stacked comestible structures.

In addition to one or more of the features described above, or as an alternative, in further embodiments each of the plurality of vertically stacked comestible structures has at least one score line, and the at least one score line of each comestible structure is generally vertically aligned.

In addition to one or more of the features described above, or as an alternative, in further embodiments rotating said first portion of said at least one comestible structure about an axis of rotation away from said second portion of said at least one comestible structure further comprises rotating said first portion of each of said plurality of vertically stacked comestible structures away from said second portion of each of said plurality of vertically stacked comestible structures.

In addition to one or more of the features described above, or as an alternative, in further embodiments rotating said first portion of each of said plurality of vertically stacked comestible structures away from said second portion of each of said plurality of vertically stacked comestible structures causes said first portion of each of said plurality of vertically stacked comestible structures to separate from said second portion of each of said plurality of vertically stacked comestible structures sequentially.

In addition to one or more of the features described above, or as an alternative, in further embodiments comprising transporting said separated first portion of said at least one comestible structure to a downstream processing system.

In addition to one or more of the features described above, or as an alternative, in further embodiments said downstream processing system is a packaging system.

In addition to one or more of the features described above, or as an alternative, in further embodiments said transporting said separated first portion of said at least one comestible structure to said downstream processing system occurs automatically via a transport mechanism in response to said separating said separated first portion of said at least one comestible structure from said second portion of separated first portion of said at least one comestible structure.

In addition to one or more of the features described above, or as an alternative, in further embodiments said transporting said separated portion of said at least one comestible structure to said downstream processing system is performed by a collaborative robot.

In addition to one or more of the features described above, or as an alternative, in further embodiments rotating said first portion of said at least one comestible structure about said axis of rotation away from said second portion of said at least one comestible structure to separate said first portion of said at least one comestible structure from said second portion of said at least one comestible structure at said at least one score line is performed by a collaborative robot.

In addition to one or more of the features described above, or as an alternative, in further embodiments said comestible includes a chewing gum.

In addition to one or more of the features described above, or as an alternative, in further embodiments said comestible includes a confection.

BRIEF DESCRIPTION OF THE DRAWINGS

The accompanying drawings incorporated in and forming a part of the specification embodies several aspects of the present invention and, together with the description, serve to explain the principles of the invention. In the drawings.

DETAILED DESCRIPTION

The following disclosure will detail particular embodiments which provide improvements for separating a comestible into individual strips suitable for use by a downstream processing system. The separating system disclosed herein can eliminate the need for manual positioning or stacking and/or separation of scored sheets required in conventional manufacturing systems. By eliminating these manual operating activities, the system can operate much more efficiently than the conventional lines, for example by reducing the required space, time, equipment, and manpower necessary to operate the system. Further, the system and method described herein reduces, and in some instances, eliminates manual handling of the comestible, thereby limiting contamination of the comestible.

The comestible discussed herein may include any type of edible product, including but not limited to chewing gum (at any stage including elastomer, partially finished base, finished chewing gum base, and finished chewing gum), confection (which may be synonymous with chewing gum, candy, or a combination of chewing gum and candy), sweet and savory biscuits and cakes, nuts, and grains for example. For ease of description, the comestible will be referred to as chewing gum for the remainder of the description. It should be understood that certain compositions of chewing gum may have a non-uniform texture and/or a multi-layered composition.

Referring now to the FIGS., a separating system 20 for separating a chewing gum provided thereto into one or more portions is illustrated. The chewing gum 22, as discussed herein, may refer to any gum composition having one or more scores or score lines 24 formed therein. The chewing gum 22 to be separated is referred to as "chewing gum" or "gum" and includes, but is not limited to, compositions ranging from and inclusive of compounded elastomer to finished gum, which may include compounded elastomer in addition to some compounding aids, master batch gum base, compounded elastomer in addition to some subsequent gum ingredients, compounded elastomer in addition to some gum base ingredients and some subsequent gum ingredients, gum base, gum base in addition to some subsequent gum ingredients, master batch finished gum, and finished gum. Although the chewing gum 22 illustrated and described herein is provided to the separating system 20 in the form of cut sheets, in other embodiments, embodiments where the chewing gum 22 is fed to the separating system 20 as one or more continuous sheets of chewing gum 22, or another suitable configuration are also within the scope of the disclosure.

The separating system 20 may be used to separate the chewing gum 22 into strips or pieces 26 after forming and scoring have occurred. In some embodiments, the separating system 20 is applied after cooling and other processing steps have also been performed. In one embodiment, the separating system 20 is a portion of a gum manufacturing system (not shown) such that the chewing gum 22 supplied to the separating system 20 is provided from another component of the manufacturing system, such as from an upstream forming station for example. Further, the separating system 20 may be located upstream from one or more other processing components of a gum manufacturing system, such as a processing component operable to cool and/or condition the separated pieces of gum for example. Accordingly, in an embodiment, the sheets of chewing gum 22 may enter the separating system 20 with a temperature ranging from 10 degrees Celsius to 45 degrees Celsius. Further, the chewing gum 22 provided to the separating system 20 may have a substantially uniform thickness measured perpendicular to the flow of the chewing gum 22 through the separating system 20. The sheets of chewing gum 22, such as used in the formation of slab gum for example, may include a single layer, or alternatively, multi-layer (2, 3, etc.) compositions. In an embodiment, single layer compositions provided to the separating system 20 have a thickness between about 2 mm and 6 mm, and multi-layer compositions provided to the separating system 20 may, but need not have an increased thickness. For example, a multi-layer composition having three layers may be provided to the separating system 20 with a thickness also between about 2 and 6 mm.

Figure 1:
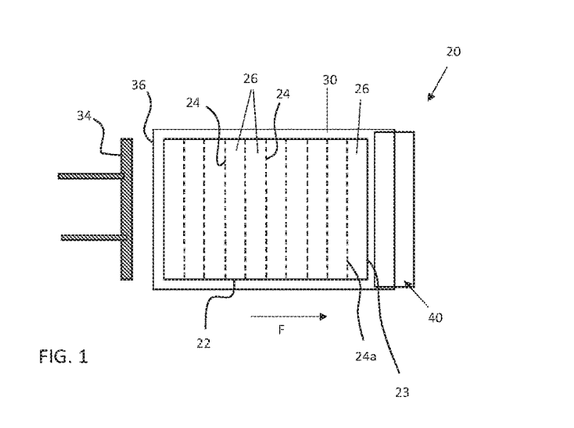
FIG. 1 is a schematic diagram of a top view of a separation system of a chewing gum manufacturing system according to an embodiment.

As previously described, the chewing gum 22 provided to the separating system 20 is scored in at least a first direction. In the illustrated, non-limiting embodiment, the chewing gum 22 includes a plurality of scores 24 that extend generally perpendicular to the direction of flow of the chewing gum 22 through the separating system 20, indicated by arrow F in FIG. 1, and are formed at predetermined intervals or spacing. The scores 24 may be formed via any suitable mechanism, including but not limited to one or more rollers including a plurality of lateral knives. It should be appreciated that the depth of each of the scores 24 may be any depth less than the entire thickness of the chewing gum. Accordingly, for the purposes of this disclosure, the term "scoring" as achieved via any suitable device, may be defined as cutting to a depth less than the entire thickness of the chewing gum 22 such that a web remains between adjacent strips 26 defined by the scores 24. As a result, separate strips or portions 26 of chewing gum 22 are defined but are not created via the scores 24. Specifically, when the chewing gum 22 is scored to a depth less than the entire thickness of the chewing gum 22, the scored chewing gum 22 is provided to the separating system 20 as a single body. It should be understood that the separate strips or portions 26 of the chewing gum defined by the scores 24 may have a length measured parallel to the direction of flow less than the width of the gum sheet 22, as shown. However, it should be understood that the scores 24 may be used to define distinct strips or portions of the gum 22 having any suitable configuration, such as sheets for example.

As shown in the FIGS., the separating system 20 includes a support surface 30 and a clamping device 40 arranged adjacent a downstream end 32 of the support surface 30. The support surface 30 is configured to receive a plurality of stacked sheets of chewing gum 22 thereon to facilitate movement of the chewing gum 22 toward the clamping device 40. In the illustrated non-limiting embodiment, the support surface 30 is a fixed surface, and therefore does not actively move the chewing gum 22 located thereon. In an embodiment, a force is applied to the chewing gum 22 disposed on the support surface 30 via a drive mechanism 34, such as a translatable plunger for example. In an embodiment, the support surface 30 has a reduced friction or is frictionless such that the chewing gum 22 may be easily moved thereon from the upstream end 36 toward the downstream end 32.

Figure 2:
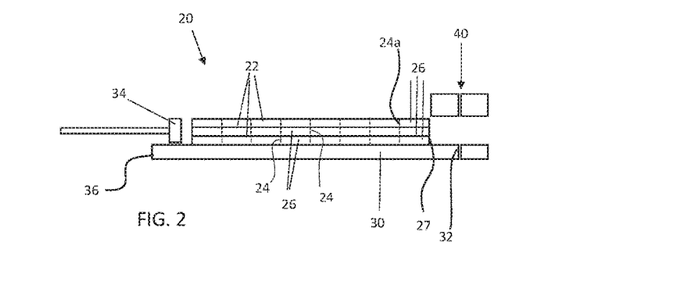
FIG. 2 is a schematic diagram of a side view of a separation system of a chewing gum manufacturing system according to an embodiment.

Although a single sheet of scored chewing gum 22 may be provided to the separating system 20 and moved via the drive mechanism 34, in other embodiments, a plurality of sheets of chewing gum 22 arranged in a stacked configuration may be provided to the separating system 20 simultaneously. With reference to FIG. 2, the drive mechanism 34 may be configured to apply a force to all of the sheets of chewing gum 22, or alternatively, to only a portion of the stacked sheets of chewing gum 22. In embodiments where only a portion of the stacked sheets of chewing gum 22 are moved via a single operation of drive mechanism 34, the portion of the stacked sheets of chewing gum 22 that are moved may, but need not be disposed in contact with the support surface 30. Rather, these sheets may be arranged at the uppermost surface of the stack separated from the support surface 30.

Figure 3:
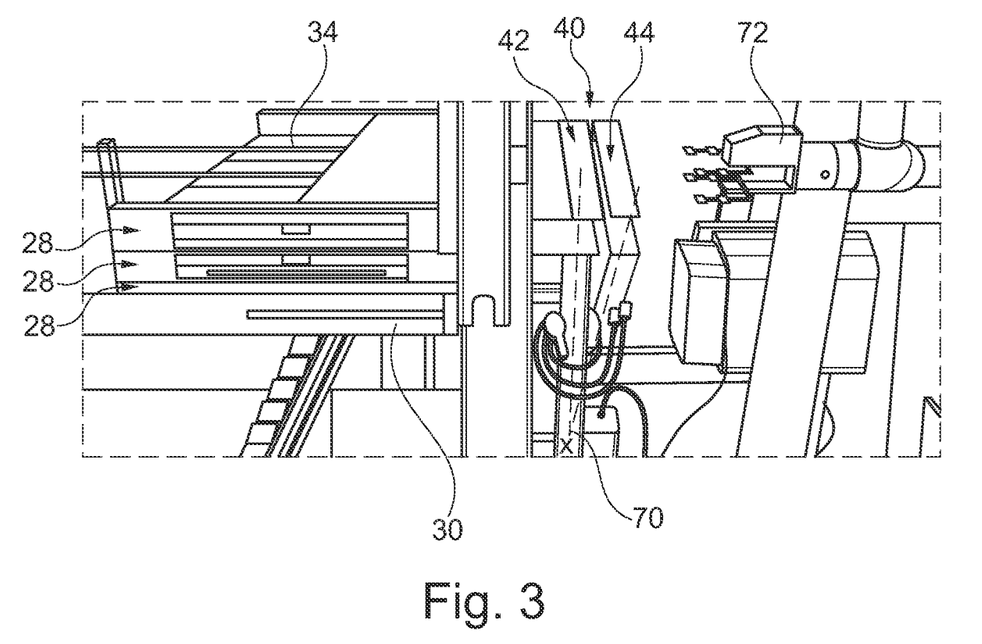
FIG. 3 is a perspective view of a separation system of a chewing gum manufacturing system according to an embodiment.
Figure 4:
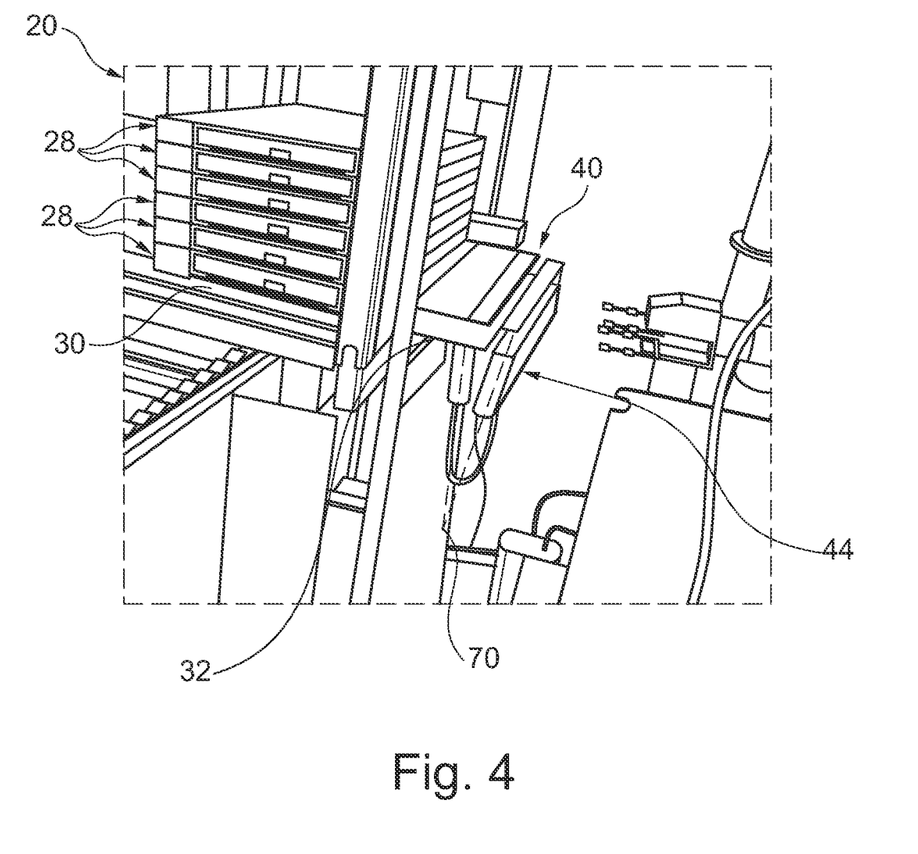
FIG. 4 is another perspective view of a separation system of a chewing gum manufacturing system according to an embodiment.
Figure 5:
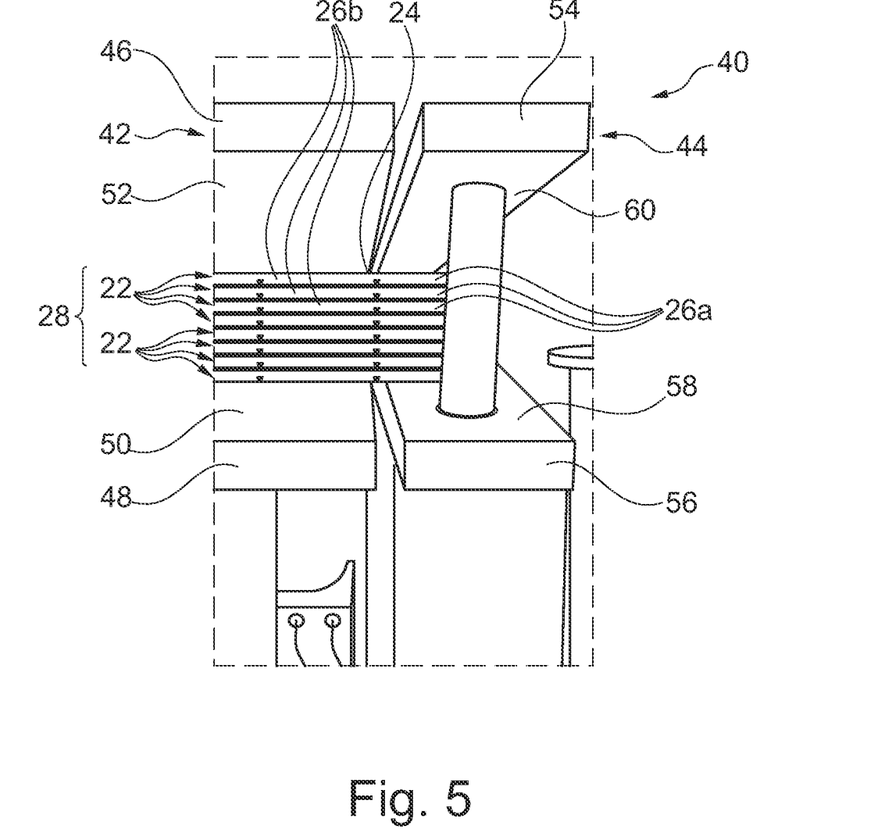
FIG. 5 is a detailed side view of a clamping device of the separation system in an unclamped configuration according to an embodiment.

In the illustrated, non-limiting embodiment of FIG. 3, the plurality of chewing gum sheets 22 are stacked to define a group 28 containing a predetermined number of sheets. Further, multiple groups 28 may be stacked vertically on top of one another on the support surface 30. The plurality of sheets, and more specifically, the plurality of scores 24 formed in the sheets of chewing gum 22 within a single group 28 are generally vertically aligned. As a result, the portions or strips 26 arranged at a first, downstream end 23 of each sheet 22, defined by the foremost score 24a in each sheet of chewing gum 22 of the group 28, are arranged in a vertically overlapping configuration. However, as best shown in FIG. 5, it should be understood that the plurality of sheets 22 need not be perfectly aligned. On the contrary, as shown, the foremost scores 24a may be offset from one another. Any offset between the foremost scores 24a is acceptable if none of the foremost scores 24a are positioned within the first and second clamping assemblies 42, 44 as described in more detail below.

The clamping device 40 arranged adjacent the downstream end 32 of the support surface 30 includes a first clamping assembly 42 and a second clamping assembly 44. The first and second clamping assemblies 42, 44 are independently operable. The first clamping assembly 42 includes an upper portion 46 and a lower portion 48. An upper surface 50 of the lower portion 48 is substantially aligned with an upper surface of the support surface 30. As used herein the term "substantially aligned" is intended to include embodiments where the upper surfaces are flush and embodiments where the upper surfaces are offset from one another by a distance of up to 25% of a thickness of either the support surface 30 or the lower portion 48. In an embodiment, the first clamping assembly 42 of the clamping device 40 may be integrated into, or integrally formed with the support surface 30. Alternatively, the first clamping assembly 42 may be arranged separate from and directly adjacent to the downstream end 32 of the support surface 30.

Figure 6:
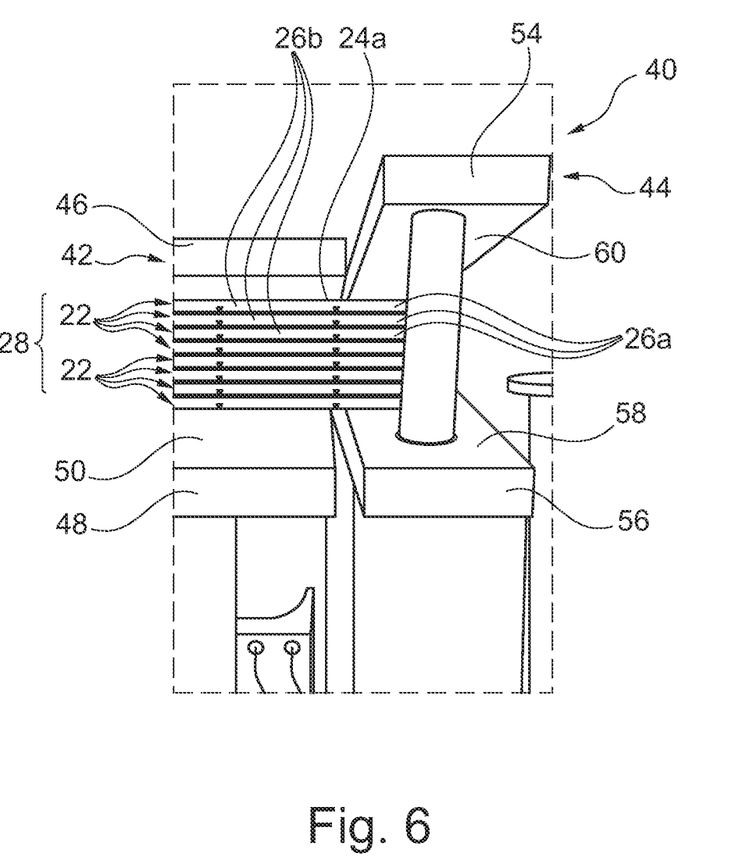
FIG. 6 is a detailed side view of a clamping device of the separation system in a partially clamped configuration according to an embodiment.

The upper portion 46 of the first clamping assembly 42 is movable between a first unclamped position (FIG. 5) and a second clamped position (FIG. 6) relative to the lower portion 48 of the first clamping assembly 42. In the unclamped position, the clearance 52 between the upper portion 46 and the lower portion 48 is greater than the total thickness of the plurality of sheets of chewing gum 22 provided to the clamping assembly 42. In the clamped position, the clearance 52 between the upper portion 46 and the lower portion 48 is less than the clearance 52 when the clamping assembly is in the unclamped position. As a result, the upper and lower portions 46, 48 of the first clamping assembly 42 cooperate to apply a clamping force to the adjacent portion of the sheets of chewing gum 22, thereby preventing movement of the sheets of chewing gum 22 relative to the first clamping assembly 42.

The second clamping assembly 44 similarly includes an upper portion 54 and a lower portion 56. The second clamping assembly 44 is arranged downstream from the first clamping assembly 42 relative to the direction of movement of the chewing gum 22. An upper surface 58 of the lower portion 56 is substantially aligned with the upper surface 50 of the lower portion 48 of the first clamping assembly 42. Accordingly, the one or more sheets of chewing gum 22 may be easily moved, such as translated via the drive mechanism 34 for example, from the first clamping assembly 42 to the second clamping assembly 44. In an embodiment, the chewing gum 22 is provided to the clamping device 40 such that a foremost strip 26a of at least the one or more scored sheet of chewing gum 22 is arranged within the second clamping assembly 44 and an adjacent upstream strip 26b of the scored sheets of chewing gum 22 is arranged within the first clamping assembly 42. In this configuration, the first and second clamping assemblies 42, 44 are disposed on opposing sides of a score line 24, such as the foremost score line 24a, formed in the one or more stacked sheets 22.

Figure 7:
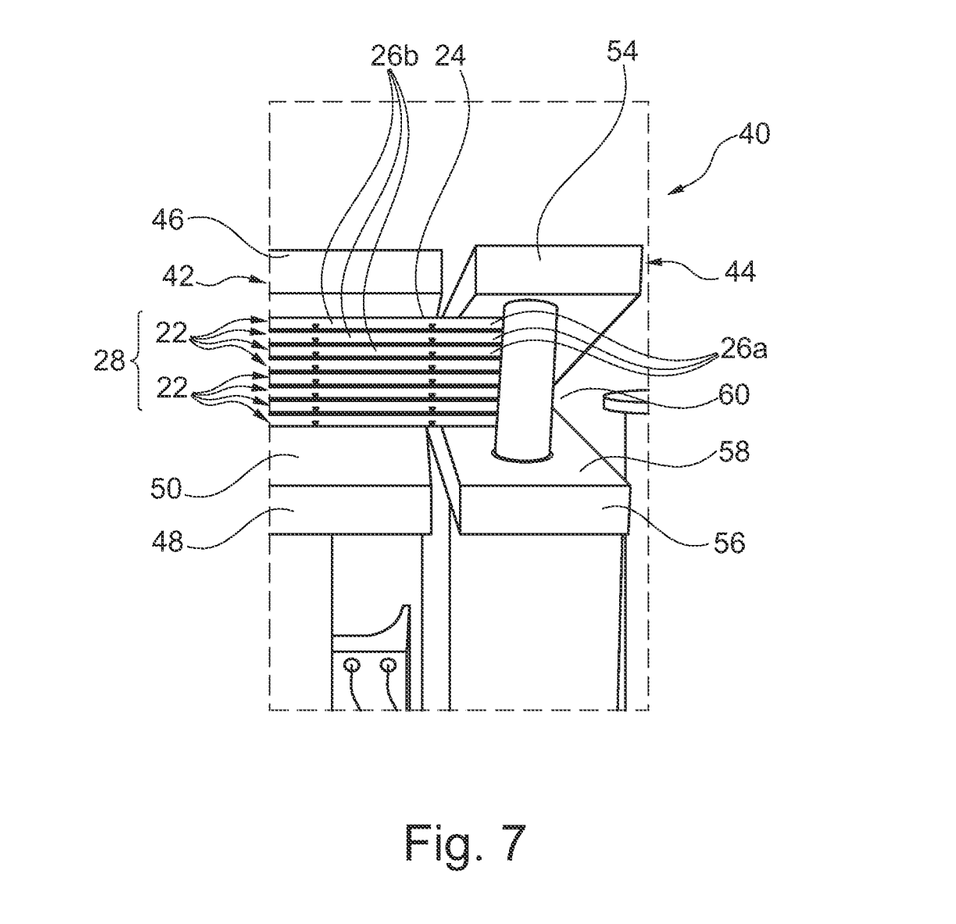
FIG. 7 is a detailed side view of a clamping device of the separation system in a fully clamped configuration according to an embodiment.

The upper portion 54 of the second clamping assembly 44 is also movable relative to the lower portion 56 of the second clamping assembly 44 between a first unclamped position (FIGS. 5 and 6) and a second clamped position (FIG. 7). The clearance 60 between the upper portion 54 and the lower portion 56 is greater than the total thickness of the plurality of sheets 22 being provided to the clamping assembly 44 when in the unclamped position, and when in the clamped position is less than the clearance in the unclamped position. Because the total height or thickness of the clearance 60 of the second clamping assembly 44 in the clamped position is less than the thickness of the one or more sheets 22 positioned therein, the upper and lower portions 54, 56 of the second clamping assembly 44 cooperate to apply a clamping force to the adjacent portion of the sheets 22, such as to the first strip 26a of each of the plurality of stacked sheets 22. Accordingly, application of the clamping force via the second clamping assembly 44 prevents movement of the clamped portion of the chewing gum sheets 22 relative to the second clamping assembly 46.

Transformation of the first and second clamping assemblies 42, 44 between the unclamped position and the clamped position may occur in any suitable manner, including but not limited to via a pneumatic, hydraulic, electric, or electromechanical actuator. In an embodiment, a solenoid contained within the lower portion 48, 56 of the clamping assemblies 42, 44 may be selectively operated to move the upper portions 46, 54, thereby reducing the clearance 52, 60. Further, it should be understood that the first clamping assembly 42 and the second clamping assembly 44 may be operated by separate mechanisms, or alternatively, by a single mechanism.

In an embodiment, the clearance 52, 60 of the first clamping assembly 42 and the second clamping assembly 44, respectively when in the clamped position is generally equal. The clamping force applied by the first clamping assembly 42 to the one or more stacked sheets of chewing gum 22 is similar or equal to the clamping force applied by the second clamping assembly 44 to the one or more stacked sheets of chewing gum 22. However, embodiments where the clearance 50, 60 and/or the clamping force applied by the first and second clamping assemblies 42, 44 are different are also within the scope of the disclosure. More specifically, any clearance and corresponding clamping force applied by the clamping assemblies 42, 44 to one or more sheets of chewing gum 22 received therein is suitable if the portions 26 of chewing gum 22 are prevented from moving relative to the clamping assembly 40. Further, it should be understood that the clamping force applied by both the first and second clamping assemblies 42, 44 is limited so as not to damage or permanently deform the chewing gum sheets 22.

Figure 8:
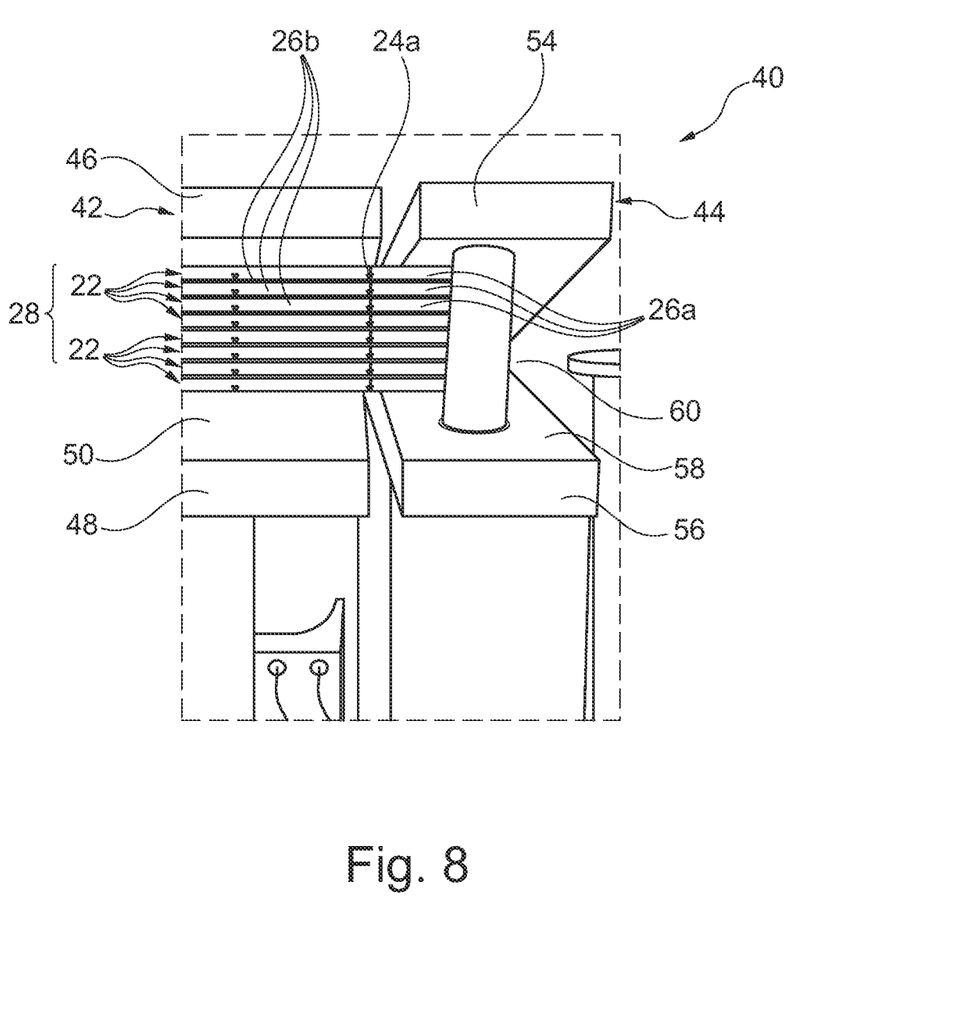
FIG. 8 is a detailed side view of a clamping device of the separation system in a partially rotated configuration according to an embodiment.

The second clamping assembly 44 is additionally configured to rotate relative to the first clamping assembly 42 about an axis of rotation X (see FIG. 3). In an embodiment, the axis of rotation X is located at the intersection of a projection line extending from the first and second clamping assemblies 42, 44, respectively. As shown, the axis of rotation X extends generally parallel to the width of the chewing gum 22 and perpendicular to the direction of movement of the chewing gum 22 relative to the support surface 30 driven by the drive mechanism 34. An actuation mechanism, illustrated schematically at 70, is coupled to the second clamping assembly 44 and is selectively operable to rotate the second clamping assembly 44 about the axis X between a first position (FIG. 6) and a second position (FIG. 8). The second clamping assembly 44 is typically rotated via application of a single torque when in the clamped position. As a result, the upper portion 54, the lower portion 56, and the portion 26a of the one or more gum sheets 22 being clamped by the upper and lower portions 54, 56 of the second clamping assembly 44 rotate about the axis X in unison to apply tension to the one or more sheets of chewing gum 22.

Figure 9:
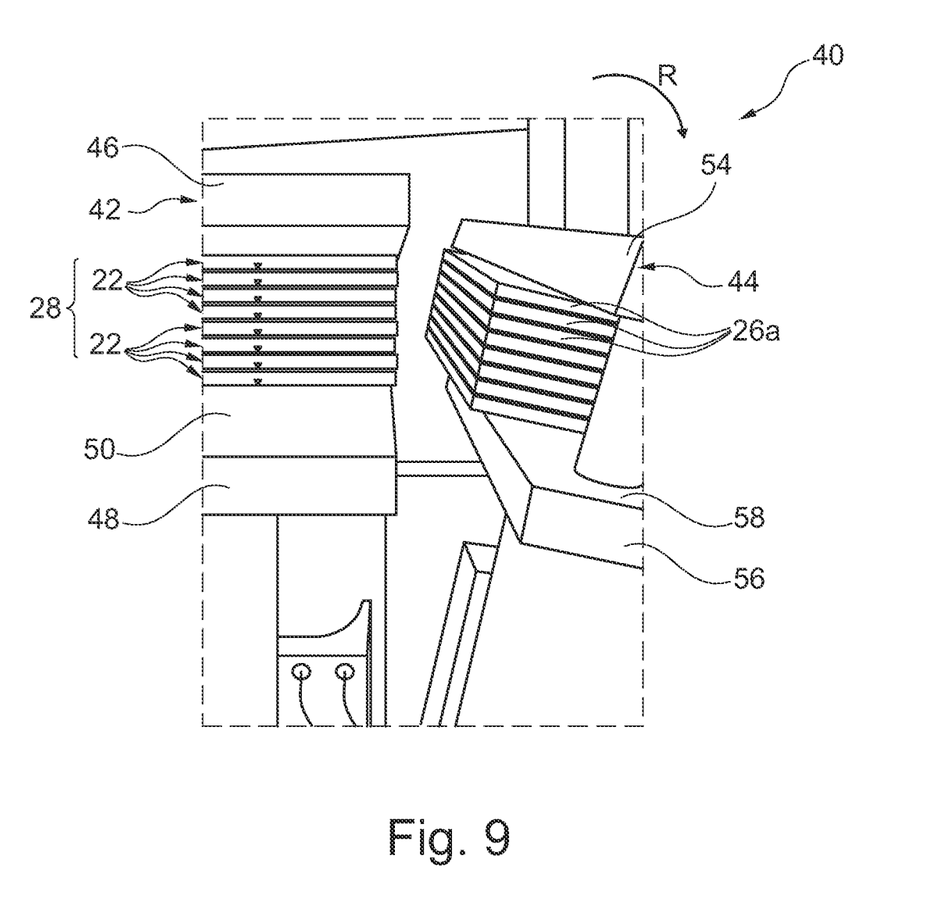
FIG. 9 is a detailed side view of a clamping device of the separation system in a fully rotated configuration according to an embodiment.

Through application of this rotational force to the second clamping assembly 44, in a clockwise or downward direction away from the first clamping assembly 42 as illustrated by arrow F in FIG. 9, each of the one or more stacked sheets of chewing gum 22 disposed within the clamping device 40 is separated into multiple portions 26 along a corresponding score line 24 positioned generally between the first clamping assembly 42 and the second clamping assembly 44. The rotational force applied to the second clamping assembly, and the resulting force or torque applied to the sheets 22 is greater than the tensile strength of the chewing gum 22 at a score line, and specifically of the tensile strength at the score line 24 disposed between the first and second clamping assemblies 42, 44. In embodiments where a plurality of stacked sheets 22 are installed within the clamping device 40, the foremost portion or strip 26a of each of the stacked sheets 22 clamped by the second clamping assembly 44 is separated from a remainder of the stacked sheet 22. Because the strips 26a are separated from the remainder of the sheets 22 via a torque or rotational force, the strips 26a being clamped by the second clamping device 44 break sequentially. In the illustrated, non-limiting embodiment, the strip 26a of the gum sheet 22 positioned furthest from the axis of rotation X is configured to break or separate first, and the strip 26 of the sheet 22 positioned closes to the axis of rotation X is configured to break or separate last. As shown in FIG. 7, when the second clamping assembly 44 is in transition from the first position to the second position, only some of the strips 26a clamped by the second clamping assembly 44 have been separated from the remainder of the sheets 22 along a respective score line 24. Further, at least one of the strips 26a remains connected to a corresponding chewing gum sheet 22, while a strip 26a associated with another sheet 22 within the group 28 is separated therefrom. In the illustrated, non-limiting embodiment, when the second clamping assembly 44 is in the rotated second position, the distance between the upper portion 54 of the second clamping assembly 44 and the upper portion 46 of the first clamping assembly 42 is greater than the distance between the lower portion 56 of the second clamping assembly 42 and the lower portion 48 of the first clamping assembly 42. The difference in these distances, however, will depend on the location of the axis of rotation X.

After separation of the one or more strips 26a clamped by the second clamping assembly 44 from the one or more sheets of chewing gum 22 being clamped by the first clamping assembly 42, the second clamping assembly 44 may be rotated in an opposite direction about the axis of rotation, toward the first clamping assembly 42 and its first or original position. In an embodiment, the upper portion 54 of the second clamping assembly 44 will transform to the unclamped position as the second clamping assembly 44 pivots about axis X toward the first clamping assembly 42. However, in other embodiments, the second clamping assembly 44 may be unclamped either prior to rotating about axis X or after returning to its original position.

Figure 10:
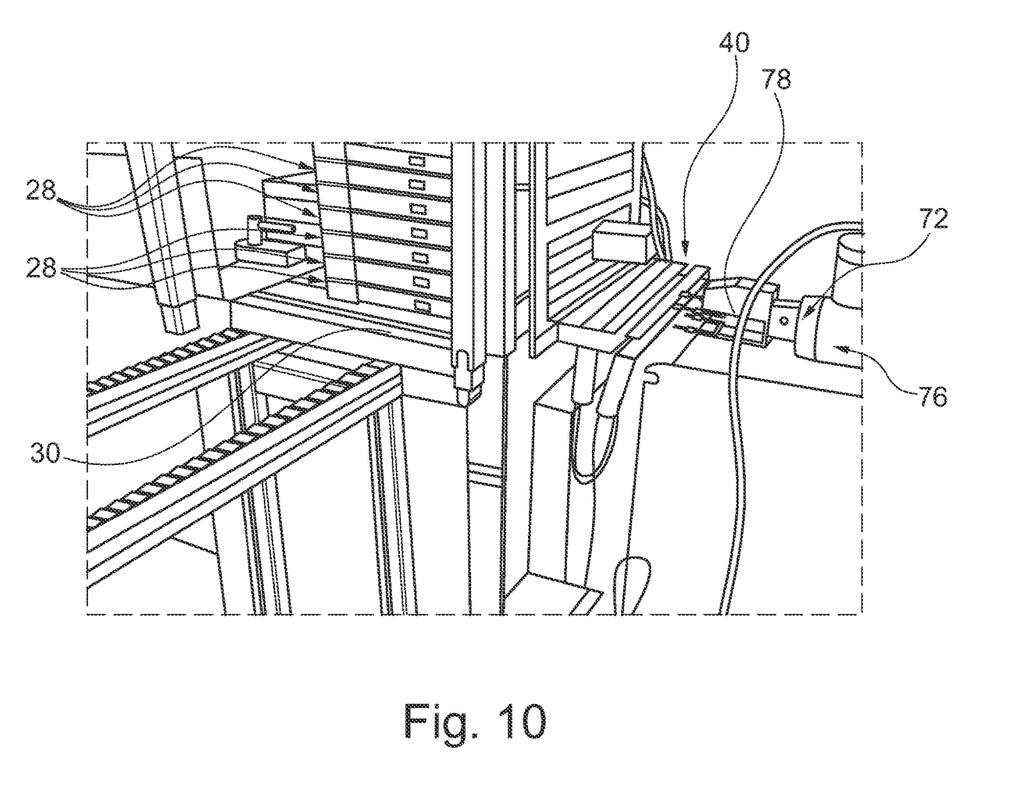
FIG. 10 is a perspective view of a downstream transport mechanism in a first position cooperating with the separation system according to an embodiment.
Figure 11:
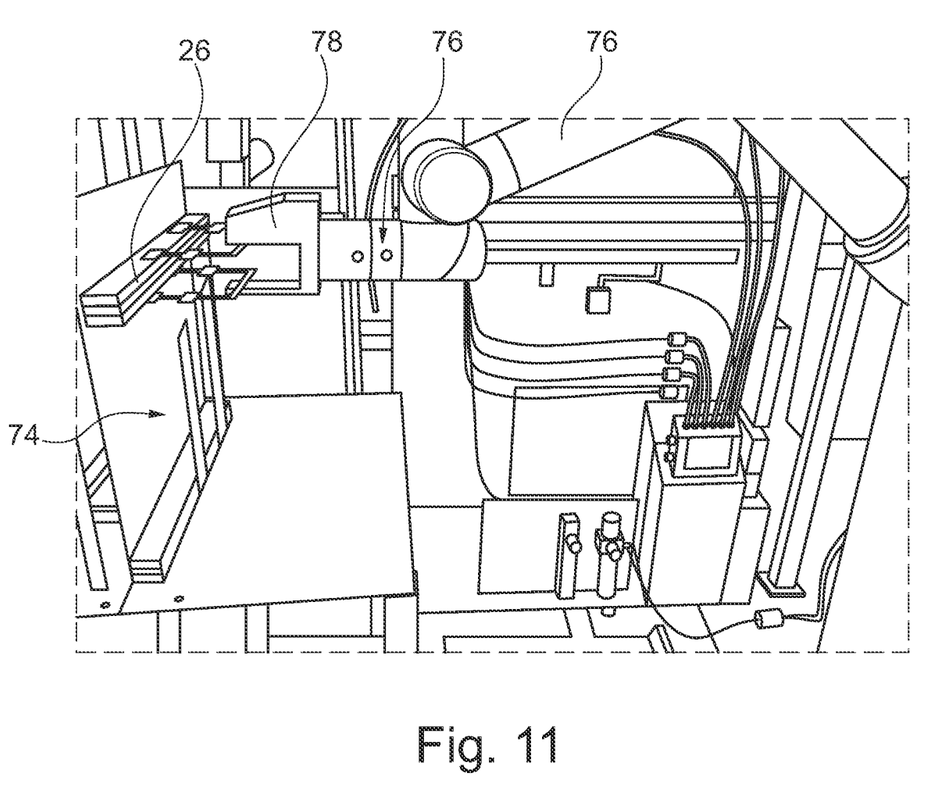
FIG. 11 perspective view of a downstream transport mechanism in a second position cooperating with a downstream component of the chewing gum manufacturing system according to an embodiment.

With specific reference to FIGS. 3, 10, and 11, the separating system 20 additionally includes a transport mechanism 72 arranged downstream from the clamping system 40. This transport mechanism 72 may be operable to transfer the one or more separated strips 26 arranged within the clearance 60 of the second clamping assembly 44 to a downstream component 74 (FIG. 11) of the gum manufacturing system, such as to a packaging apparatus for example. In the illustrated, non-limiting embodiment the transport mechanism 72 includes a robotic arm 76 having a movable claw or other attachment 78 operable to selectively grasp the one or more strips 26 disposed within the clearance 60 of the second clamping assembly 44 after being separated from the remainder of the chewing gum sheets 22. However, it should be understood that any suitable mechanism for delivering the separated strips 26a to a downstream component 74 of the manufacturing system is within the scope of the disclosure.

All a portion of the separating system 20 may be workable via a collaborative robot, also referred to as a "cobot" or a "co-robot." For example, in an embodiment, the transport mechanism 72 configured to remove the separated portions 26 of chewing gum 22 from the clamping device 40 and provide them to a portion 74 of a packing system is a cobot. The cobot may be designed such that a maximum force that can be exerted by the cobot is limited, such as to less than or equal to 50 N for example, to prevent injury to a human who may interfere with operation thereof. However, it should be understood that the separating system 20 as a whole may be considered a cobot, or alternatively, other portions of the separating system, such as the drive mechanism 34 and the clamping device 40 may also be considered cobots.

Upon removal of the separated strips 26 from the second clamping assembly 44, the upper portion 48 of the first clamping assembly 42 may be transformed from the clamped position to the unclamped position. However, it should be understood that this transformation of the first clamping assembly 42 may occur at any time after the second clamping assembly 44 has rotated away from the first clamping assembly 42.

Through separation of the foremost strips 26a, the strips that were previously considered upstream strips 26b become the foremost strip 26a. With both the first clamping assembly 42 and the second clamping assembly 44 in an unclamped position, the foremost end 27 of the one or more sheets of chewing gum 22 are moved forward relative to the clamping device 40 such that the foremost strip 26a of the one or more chewing gum sheets 22 is aligned with the second clamping device 44 and the adjacent upstream strip 26b of the chewing gum sheets 22 is aligned with the first clamping device 42. This movement of the chewing gum sheets may occur via the transport mechanism 30, or alternatively, via a drive mechanism 34 associated with the transport mechanism 30. This process of separating the foremost strip 26a or portion of the gum from the chewing gum sheets 22 may be repeated until the sheets 22 are divided at each of the scores 24 formed therein.

The separating system 20 disclosed herein may be an "in-line" system such that chewing gum 22 may be continuously transported between the plurality of components, such as support surface 30, the clamping device 40, and the downstream component of the manufacturing system without need for removal from the system 20. In an embodiment, the chewing gum 22 does not need to be removed from the system for any necessary processing, such as conditioning or temperature control. This allows for greater production speed, volume, and efficiency relative to a conventional scoring process. However, embodiments where one or more components of the system are not "in-line" are also within the scope of the disclosure. Further, it should be appreciated that the separating system 20 illustrated and described herein may be part of a continuous and/or in-line comestible manufacturing system.

Inclusion of the separating system 20 allows for continuous and expedited gum production. Because the separating system 20 eliminates manual portions of the packaging process, such as separating sheets into strips and manually feeding the strips to a packaging system for example, high speeds and continuous operation of the separating system and downstream packaging system can be achieved while eliminating the potential for contamination of the chewing gum. Additionally, through the design of the separation system 20, deformation of the chewing gum formed in the system 20 is limited.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for separating a comestible structure into a plurality of comestible structures, the method comprising:
   providing at least one comestible structure including at least one score line to a clamping device, said clamping device including a first clamping assembly and a second clamping assembly, said first clamping assembly and said second clamping assembling being disposed on opposing sides of said at least one score line;
   clamping a portion of said at least one comestible structure in said second clamping assembly of said clamping device at a second side of said at least one score line;
   separating said portion clamped in said second clamping assembly from a remainder of said at least one comestible structure at said at least one score line via said second clamping assembly of said clamping device; and
   clamping another portion of the at least one comestible structure via said first clamping assembly of said clamping device at a first side of said at least one score line, wherein said another portion clamped in said first clamping assembly is part of said remainder of said at least one comestible structure.

2. The method of claim 1, wherein separating said portion of the at least one comestible structure from said remainder of the at least one comestible structure further comprises rotating said portion of the at least one comestible structure away from said remainder of the at least one comestible structure.

3. The method of claim 1, wherein said at least one score line is a line of weakness formed in the at least one comestible structure, the at least one score line having a thickness less than a thickness of the at least one comestible structure.

4. The method of claim 1, further comprising transporting said separated portion of at least one comestible structure to a downstream processing system.

5. The method of claim 1, wherein at least one of said clamping said portion of said at least one comestible structure in said clamping device and said separating said portion from a remainder of said at least one comestible structure at said at least one score line via said clamping device is performed by a collaborative robot.

6. The method of claim 1, wherein separating said portion from said remainder of said at least one comestible structure at said at least one score line further comprises applying a force to said portion, said force being greater than a tensile strength of said at least one comestible structure at said at least one score line.

7. The method of claim 1, wherein said comestible includes a chewing gum.

8. A method for separating a comestible structure into a plurality of comestible structures, the method comprising
providing at least one comestible structure including at least one score line, said score line defining a first portion and a second portion of said at least one comestible structure on opposing sides thereof, wherein said first portion is a portion of said at least one comestible structure at a first side of said at least one score line and wherein said second portion is a portion of said at least one comestible structure at a second side of said at least one score line, opposite to said first side;
rotating said first portion of said at least one comestible structure about an axis of rotation away from said second portion of said at least one comestible structure to separate said first portion of said at least one comestible structure from said second portion of said at least one comestible structure at said at least one score line;
applying a second clamping force to said first portion of said at least one comestible structure prior to rotating said first portion of said at least one comestible structure about an axis of rotation away from said second portion of said at least one comestible structure; and
applying a first clamping force to said second portion of said at least one comestible structure prior to rotating said first portion of said at least one comestible structure about an axis of rotation away from said second portion of said at least one comestible structure.

9. The method of claim 8, wherein said rotating said first portion of said at least one comestible structure about said axis of rotation away from said second portion applies a tension to said comestible structure at said at least one score line.

10. The method of claim 8, wherein said axis of rotation is offset from said at least one comestible structure.

11. The method of claim 8, wherein said axis of rotation is offset from said at least one score line.

12. The method of claim 8, wherein said rotating said first portion of said at least one comestible structure about an axis of rotation away from said second portion of said at least one comestible structure is controlled automatically by an actuation mechanism.

13. The method of claim 8, wherein the at least one comestible structure is a chewing gum sheet.

14. The method of claim 8, wherein the at least one comestible structure includes a plurality of vertically stacked comestible structures.

15. The method of claim 8, further comprising transporting said separated first portion of said at least one comestible structure to a downstream processing system.

16. The method of claim 8, wherein rotating said first portion of said at least one comestible structure about said axis of rotation away from said second portion of said at least one comestible structure to separate said first portion of said at least one comestible structure from said second portion of said at least one comestible structure at said at least one score line is performed by a collaborative robot.

17. The method of claim 8, wherein said comestible includes a chewing gum.

* * * * *